United States Patent [19]

Yokota et al.

[11] Patent Number: 4,666,523
[45] Date of Patent: May 19, 1987

[54] SIZING AGENT SUITABLE FOR USE IN PAPER MAKING

[75] Inventors: Kinya Yokota, Shiga; Akinobu Ichihara, Kameoka; Yasuharu Tanakamaru, Kyoto; Yoshio Takahashi, Yokosuka, all of Japan

[73] Assignees: Dai-chi Kogyuo Seiyaku Co., Ltd.; Mitsubishi Oil Co., Ltd., both of Japan

[21] Appl. No.: 831,289

[22] Filed: Feb. 20, 1986

[51] Int. Cl.$^4$ ................................................ C08L 3/00
[52] U.S. Cl. ..................... 106/213; 162/158; 252/174.21
[58] Field of Search ............ 106/213; 252/174.21; 162/158

[56] References Cited

U.S. PATENT DOCUMENTS

| | | | |
|---|---|---|---|
| 3,031,510 | 4/1962 | Crecelius | 252/174.21 |
| 3,240,819 | 3/1966 | Gaetner et al. | 252/174.21 |
| 3,374,277 | 3/1968 | Vanderberg | 106/174.21 |
| 4,040,900 | 8/1977 | Mazzarella et al. | 162/158 |
| 4,207,142 | 6/1980 | Shepherd | 106/213 |
| 4,222,820 | 9/1980 | Hiskens | 106/213 |
| 4,326,977 | 4/1982 | Schmolka | 252/174.21 |
| 4,514,229 | 4/1985 | Sato et al. | 106/213 |
| 4,544,414 | 10/1985 | Kawatani et al. | 252/174.21 |
| 4,545,855 | 10/1985 | Sweeney | 106/243 |
| 4,545,856 | 10/1985 | Sweeney | 162/158 |

OTHER PUBLICATIONS

Appleton, Wisconsin, U.S.; & JP-A-83 31196 (Meisei Chemical Works Co. Ltd.) 23-02-1983.

*Primary Examiner*—Theodore Morris
*Attorney, Agent, or Firm*—Antonelli, Terry & Wands

[57] ABSTRACT

A composition useful as a paper sizing agent comprising a substituted succinic anhydride of the formula:

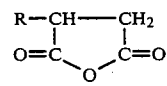

wherein R is a hydrocarbon group having at least 6 carbon atoms selected from the group consisting of an alkyl group, an alkenyl group, an aralkyl group or an aralkenyl group,
and a non-ionic surface active agent having a terminal hydroxyl group bonding to tertiary carbon. The composition has excellent storage stability, and can exhibit an excellent sizing effect even if stored for a long term.

9 Claims, No Drawings

SIZING AGENT SUITABLE FOR USE IN PAPER MAKING

BACKGROUND OF THE INVENTION

The present invention relates to a sizing agent suitable for use in paper making, and more particularly to a paper sizing agent comprising a substituted succinic anhydride and an emulsifier, which is capable of exhibiting an excellent sizing effect even after stored for a long term.

Various materials have been used for sizing paper. In recent years, sizing using a dicarboxylic acid anhydride has been proposed.

Dicarboxylic acid anhydrides such as substituted succinic anhydrides, which have been used for sizing paper in neutral pH region, have been used usually in the form of an aqueous emulsion by emulsifying in water using an emulsifier such as a surface active agent or cationized starch and a homogenizer or homomixer. It is known that if the dicarboxylic acid anhydride is previously admixed with an emulsifier and stored in the form of a mixture, the emulsifying ability is lowered in a short term and, therefore, the sizing effect is also lowered.

It is an object of the present invention to provide a paper sizing agent comprising a substituted succinic anhydride and an emulsifier, which can exhibit an excellent sizing effect even after stored for a long term.

The above and other objects of the present invention will become apparent from the description hereinafter.

SUMMARY OF THE INVENTION

It has now been found that when a non-ionic surface active agent having a terminal tertiary hydroxyl group is used as at least one component of the emulsifier for emulsifying a substituted succinic anhydride, an excellent sizing effect is obtained even if they are stored in the form of a mixture for a long term.

The term "terminal tertiary hydroxyl group" as used herein means a terminal hydroxyl group bonding to tertiary carbon, in other words, a tertiary alcohol residue represented by the formula:

positioned at the molecular end.

In accordance with the present invention, there is provided a sizing agent comprising a substituted succinic anhydride of the formula: (I):

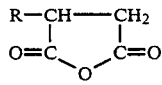

wherein R is a hydrocarbon group having at least 6 carbon atoms selected from the group consisting of an alkyl group, an alkenyl group, an aralkyl group or an aralkenyl group, and an emulsifier comprising a non-ionic surface active agent having a terminal tertiary hydroxyl group.

DETAILED DESCRIPTION

In the above substituted succinic anhydrides of the formula (I), those having the substituent R which is a $C_6$ to $C_{30}$ alkyl or alkenyl group, especially a $C_{12}$ to $C_{24}$ alkyl or alkenyl group are preferred. Representative examples of the substituted succinic anhydride (I) are, for instance, dodecyl succinic anhydride, n-hexadecyl succinic anhydride, n-octadecenyl succinic anhydride, isooctadecenyl succinic anhydride, 1-methyl-2-pentadecenyl succinic anhydride and 1-propyl-2-pentadecenyl succinic anhydride. The substituted succinic anhydrides may be used alone or in admixture thereof.

In the present invention, a non-ionic surface active agent having terminal tertiary hydroxyl group is employed as at least one component of the emulsifier used for emulsifying the compound (I).

The non-ionic surface active agent having terminal tertiary hydroxyl group can be prepared, for instance, by addition reaction of usual non-ionic surface active agent and isobutylene oxide or α-methylstyrene oxide, but the process for the preparation thereof is not limited thereto.

Representative examples of the non-ionic surface active agent used as a raw material in the above reaction are, for instance:

polyoxyethylene alkyl ether which is an adduct of 3 to 40 moles of ethylene oxide with an alcohol having a $C_6$ to $C_{20}$ alkyl group;

polyoxypropylene alkyl ether which is an adduct of 3 to 40 moles of propylene oxide with an alcohol having a $C_6$ to $C_{20}$ alkyl group;

polyoxypropylene-polyoxyethylene alkyl ether which is an adduct of 3 to 40 moles of a mixture of propylene oxide and ethylene oxide with an alcohol having a $C_6$ to $C_{20}$ alkyl group;

polyoxyethylene alkylphenyl or aralkylphenyl ether which is an adduct of 3 to 40 moles of ethylene oxide with an alkylphenol or aralkylphenol having a $C_4$ to $C_{28}$ alkyl or aralkyl group;

polyoxypropylene alkylphenyl or aralkylphenyl ether which is an adduct of 3 to 40 moles of propylene oxide with an alkylphenol or aralkylphenol having a $C_4$ to $C_{28}$ alkyl or aralkyl group;

polyoxyethylene-polyoxypropylene alkylphenyl or aralkylphenyl ether which is an adduct or 3 to 40 moles of a mixture of ethylene oxide and propylene oxide with an alkylphenol or aralkylphenol having a $C_4$ to $C_{28}$ alkyl or aralkyl group;

polyethylene glycol carboxylic acid ester which is an adduct of 3 to 40 moles of ethylene oxide with a carboxylic acid having a $C_4$ to $C_{20}$ alkyl or alkenyl group, or an ester of polyethylene glycol (3 to 40 moles) with the above carboxylic acid;

polypropylene glycol carboxylic acid ester which is an adduct of 3 to 40 moles of propylene oxide with a carboxylic acid having a $C_4$ to $C_{20}$ alkyl or alkenyl group, or an ester of polypropylene glycol (3 to 40 moles) with the above carboxylic acid;

polyoxypropylene-polyoxyethylene carboxylic acid ester which is an adduct of 3 to 40 moles of a mixture of propylene oxide and ethylene oxide with a carboxylic acid having a $C_4$ to $C_{20}$ alkyl or alkenyl group, or an ester of polyoxypropylene-polyoxyethylene diol (3 to 40 moles) with the above carboxylic acid;

polyoxyethylene alkyl- or alkylene-amine which is an adduct of 3 to 40 moles of ethylene oxide with an alkyl-or alkylene-amine having a $C_6$ to $C_{20}$ alkyl or alkylene group;

polyoxypropylene alkyl- or alkylene-amine which is an adduct of 3 to 40 moles of propylene oxide with an alkyl-or alkylene-amine having a $C_6$ to $C_{20}$ alkyl or alkylene group;

polyoxypropylene-polyoxyethylene alkyl- or alkylene-amine which is an adduct of 3 to 40 moles of a mixture of propylene oxide and ethylene oxide with an alkyl- or alkylene-amine having a $C_6$ to $C_{20}$ alkyl or alkylene group;

adduct of 3 to 40 moles of ethylene oxide with an alkyl mercaptan having a $C_6$ to $C_{20}$ alkyl group;

adduct of 3 to 40 moles of propylene oxide with an alkyl mercaptan having $C_6$ to $C_{20}$ alkyl group;

adduct of 3 to 40 moles of a mixture of propylene oxide and ethylene oxide with an alkyl mercaptan having a $C_6$ to $C_{20}$ alkyl group;

adduct of 3 to 40 moles of ethylene oxide with a reaction product of a carboxylic acid having a $C_4$ to $C_{20}$ alkyl or alkenyl group and an alkanolamine;

adduct of 3 to 40 moles of propylene oxide with a reaction product of a carboxylic acid having a $C_4$ to $C_{20}$ alkyl or alkenyl group and an alkanolamine;

adduct of 3 to 40 moles of a mixture of propylene oxide and ethylene oxide with a reaction product of a carboxylic acid having a $C_4$ to $C_{20}$ alkyl or alkenyl group and an alkanolamine;

adduct having a molecular weight of at most 1,000 of at least 3 moles of ethylene oxide with a polyhydric alcohol, a polycarboxylic acid, a polyamine, a polyhydric phenol, or their derivatives;

adduct having a molecular weight of at most 1,000 of at least 3 moles of propylene oxide with a polyhydric alcohol, a polycarboxylic acid, a polyamine, a polyhydric phenol, or their derivatives;

adduct having a molecular weight of at most 1,000 of at least 3 moles of a mixture of ethylene oxide and propylene oxide with a polyhydric alcohol, a polycarboxylic acid, a polyamine, a polyhydric phenol, or their derivatives;

adduct having a molecular weight of at most 5,000 of at least 3 moles of ethylene oxide with an ester of castor oil or lanoline having hydroxyl group;

adduct having a molecular weight of at most 5,000 of at least 3 moles of propylene oxide with an ester of castor oil or lanoline having hydroxyl group;

adduct having a molecular weight of at most 5,000 of at least 3 moles of a mixture of ethylene oxide and propylene oxide with an ester of castor oil or lanoline having hydroxyl group; and ether of polyethylene glycol, polypropylene glycol or polyoxyethylene-polyoxypropylene copolymer. In particular, there are preferred adducts of 3 to 40 moles, especially 10 to 25 moles, of ethylene oxide with an alkylphenol or aralkylphenol having a $C_4$ to $C_{28}$ alkyl or aralkyl group, especially a $C_{14}$ to $C_{20}$ alkyl or aralkyl group (polyoxyethylene alkylphenyl or aralkylphenyl ethers).

The non-ionic surface active agent having terminal tertiary hydroxyl group has no or little reactivity to the substituted succinic anhydride (I) and, therefore, even if the both are mixed and stored for a long term, the initial emulsifiability can be maintained. Also, a conventionally used expensive emulsification equipment is not required, and it is possible to prepare an aqueous emulsion by using a simple agitating apparatus.

The non-ionic surface active agent having terminal tertiary hydroxyl group is used in an amount of 1 to 25% by weight, preferably 3 to 20% by weight, based on the substituted succinic anhydride (I). When the amount is less than 1% by weight, the compound (I) is not sufficiently emulsified, and when the amount is more than 25% by weight, an emulsion of good state is obtained, but the sizing effect is remarkably lowered.

The non-ionic surface active agent having terminal tertiary hydroxyl group may be employed in combination with anionic surface active agents, other non-ionic surface active agents, and/or cationized starch as an emulsifier for emulsifying the substituted succinic anhydride.

The paper sizing agent of the present invention can be formed into an aqueous emulsion in a usual manner. For instance, the substituted succinic anhydride (I) and emulsifier are uniformly admixed and the mixture is dispersed into water to form an emulsion. Alternatively, the emulsifier is first added to water and the substituted succinic anhydride is then added thereto to form an emulsion. The former method wherein a uniform mixture of the compound (I) and the emulsifier is dispersed into water, is convenient and moreover is adoptable, since the sizing composition of the present invention can maintain the initial emulsifiability even if stored for a long term. According to the present invention, it is also possible to use a simple agitator such as a propeller mixer, a paddle mixer or a line mixer as a mixing machine for forming an aqueous emulsion.

The sizing agent of the present invention comprising the substituted succinic anhydride (I) and the emulsifier may be used in combination with other known sizing agents for internal sizing of paper such as rosin sizing agents, petroleum sizing agents, wax sizing agents and alkyl ketene dimer sizing agent, as occasion demands.

The use of a fixing agent is effective for increasing the retention of the sizing agent. Cationized starch and cationic polymers are preferably used as a fixing agent. Examples of the cationic polymers are, for instance, polyaminepolyamide-epihalohydrin, polyvinyl pyridine and quaternary salts thereof, cyclopolymerization products of halogenated diallyl, and various cationized polyacrylamides.

In paper making, the sizing agent of the present invention is used in an amount of 0.01 to 4% by weight, preferably 0.05 to 2% by weight, as solid matter based on pulp.

The fixing agent can be added to a pulp slurry simultaneously with, before or after adding the sizing agent, but the addition after adding the sizing agent is preferred.

Wet paper sheets or webs obtained by adding the sizing agent to an aqueous pulp slurry and forming the pulp into sheets or webs are dried usually at a temperature of 80° to 140° C.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLES 1 to 14 and COMPARATIVE EXAMPLES 1 and 2

An alkenyl succinic anhydride prepared by reaction of a linear internal olefin having 14 to 18 carbon atoms and maleic anhydride was uniformly admixed with, as an emulsifier, each of the non-ionic surface active agents having terminal tertiary hydroxyl group prepared by addition reaction of non-ionic surface active agents and isobutylene oxide (IBO) or α-methylstyrene oxide (MSO), and the non-ionic surface active agents having no terminal tertiary hydroxyl group shown in Table 1.

The resulting mixture (sizing agent) was subjected to infrared spectrophotometry to observe the presence of ester absorption in the vicinity of 1,730 cm$^{-1}$ immediately after preparing the mixture and after allowing the mixture to stand at 50° C. for 1 month.

The results are shown in Table 1.

Also, the mixture was uniformly dispersed into a predetermined amount of water to form an aqueous emulsion containing the alkenyl succinic anhydride in a concentration of 0.5%. The emulsion was added to a pulp slurry so that the amount of the sizing agent (as solid matters) was 0.2% on a dry pulp basis, and the pulp was formed into a sheet. The degree of sizing was measured by a Stoeckight method according to Japanese Industrial Standard (JIS) P-8122.

With respect to the mixture (sizing agent) allowed to stand at 50° C. for 1 month, the above procedures were repeated.

The results are shown in Table 2.

The conditions of paper making were as shown below.

Pulp: LBKP
Basis weight: 70 g/m$^2$
Filler: calcium carbonate (20% on a dry pulp basis)
Fixing agent: cationized starch
Drying: rotary drier (105° C., 3 minutes)
Paper machine: TAPPI standard paper machine

TABLE 1

| | Emulsifier | Amount (% based on substituted succinic anhydride) | Absorption by ester Just after mixing | Absorption by ester After 1 month at 50° C. |
|---|---|---|---|---|
| Ex. 1 | Distyrenated phenol/EO(15)/IBO(1) | 12 | None | None |
| Ex. 2 | Castor oil/EO(18)/PO(3)/IBO(2) | " | " | " |
| Ex. 3 | Nonylphenol/EO(20)/PO(5)/IBO(1) | " | " | " |
| Ex. 4 | Dinonylphenol/PO(5)/EO(18)/IBO(3) | " | " | " |
| Ex. 5 | Lauryl alcohol/EO(16)/IBO(1) | " | " | " |
| Ex. 6 | Oleic acid/EO(12)/IBO(1) | " | " | " |
| Ex. 7 | Laurylamine/EO(15)/IBO(2) | " | " | " |
| Ex. 8 | n-Dodecylmercaptan/EO(10)/PO(2)/IBO(1) | " | " | " |
| Ex. 9 | Lauric acid monoethanolamide/EO(9)/IBO(2) | " | " | " |
| Ex. 10 | Distyrenated phenol/EO(15)/MSO(2) | " | " | " |
| Ex. 11 | Oleyl alcohol/EO(12)/MSO(1) | " | " | " |
| Ex. 12 | Lanolin fatty acid/EO(20)/MSO(3) | " | " | " |
| Ex. 13 | Sorbitan monooleate/EO(20)/MSO(3) | " | " | " |
| Ex. 14 | Polypropylene glycol (molecular weight 1750)/EO(27)/MSO(4) | " | " | " |
| Com. Ex. 1 | Dinonylphenol/EO(8)/PO(1) | " | " | presence |
| Com. Ex. 2 | Oleyl alcohol/EO(7) | " | " | presence |

(Note)
EO: Ethylene oxide
PO: Propylene oxide
IBO: Isobutylene oxide
MSO: α-Methylstyrene oxide
Numberal in parentheses: The number of moles added

TABLE 2

| | Stoeckight sizing degree (second) Just after mixing | Stoeckight sizing degree (second) After 1 month at 50° C. |
|---|---|---|
| Ex. 1 | 32 | 32 |
| Ex. 2 | 31 | 31 |
| Ex. 3 | 30 | 29 |
| Ex. 4 | 31 | 31 |
| Ex. 5 | 29 | 28 |
| Ex. 6 | 28 | 27 |
| Ex. 7 | 30 | 29 |
| Ex. 8 | 22 | 22 |
| Ex. 9 | 25 | 23 |
| Ex. 10 | 30 | 27 |
| Ex. 11 | 26 | 22 |
| Ex. 12 | 27 | 25 |
| Ex. 13 | 31 | 29 |
| Ex. 14 | 25 | 25 |
| Com. Ex. 1 | 12 | 0 |
| Com. Ex. 2 | 8 | 0 |

EXAMPLES 15 to 21 AND COMPARATIVE EXAMPLES 3 and 4

The procedures of the preceding Examples were repeated except that the emulsifiers shown in Table 3 were employed.

The results of measurement of the Stoeckight sizing degree are shown in Table 3 with respect to sizing agents just after the preparation.

TABLE 3

| | Emulsifier | Amount (% based on substituted succinic anhydride) | Stoeckight sizing degree (second) |
|---|---|---|---|
| Ex. 15 | Nonylphenol/EO(20)/IBO(2) | 6 | 30 |
| | Sodium dodecylbenzene sulfonate | 6 | |
| Ex. 16 | Distyrenated phenol/EO(23)/PO(2)/IBO(1) | 6 | 31 |
| | Sodium dioctylsulfosuccinate | 6 | |
| Ex. 17 | Dinonylphenol/PO(2)/EO(18)/IBO(1) | 4 | |
| | Nonylphenol/EO(18) | 4 | 27 |
| | Ammonium oleyl alcohol/EO(18) sulfate | 4 | |

TABLE 3-continued

| | Emulsifier | Amount (% based on substituted succinic anhydride) | Stoeckight sizing degree (second) |
|---|---|---|---|
| Ex. 18 | Octylphenol/EO(12)/MSO(1) | 8 | 28 |
| | Sodium lauryl sulfate | 4 | |
| Ex. 19 | Stearyl alcohol/EO(18)/MSO(2) | 7 | 32 |
| | Calcium dodecylbenzene sulfonate | 5 | |
| Ex. 20 | Oleic acid/EO(30)/MSO(5) | 6 | 29 |
| | Nonylphenol/EO(8) phosphate | 6 | |
| Ex. 21 | Nonylphenol/EO(40)/PO(10)/IBO(2) | 6 | |
| | Bisphenol A/EO(10)/PO(10)/MSO(4) | 2 | 28 |
| | Distyrenated phenol/EO(13) acetic acid ester | 4 | |
| Com. Ex. 1 | Nonylphenol/EO(7) | 6 | 15 |
| | Sodium dodecylbenzene sulfonate | 6 | |
| Com. Ex. 4 | Stearyl alcohol/EO(12) | 6 | 18 |
| | Sodium lauryl sulfate | 6 | |

It is observed in Tables 1 and 2 that the sizing agent of the present invention has an excellent sizing effect.

EXAMPLES 22 to 30

An aqueous emulsion was prepared by adding 100 parts of the same alkenylsuccinic anhydride as used in Examples 1 to 14 and 5 parts of the emulsifier shown in Table 4 to 2,000 parts of water at one time.

Using the thus prepared emulsion, a paper was formed and the Stoeckight sizing degree thereof was measured in the same manner as in Examples 1 to 14.

The results are shown in Table 4.

TABLE 4

| | Emulsifier | Stoeckight sizing degree (second) |
|---|---|---|
| Ex. 22 | Distyrenated phenol/EO(15)/IBO(1) | 30 |
| Ex. 23 | Nonylphenol/EO(20/PO(5)/IBO(1) | 29 |
| Ex. 24 | Oleyl alcohol/EO(17)/IBO(2) | 32 |
| | Sodium dodecylbenzene sulfonate | |
| Ex. 25 | Tribenzylphenol/EO(25)/IBO(1) | 28 |
| | Ammonium nonylphenol/EO(21) sulfate | |
| Ex. 26 | Nonylphenol/EO(30)/MSO(2) | 31 |
| Ex. 27 | Lauric acid/PO(5)/EO(20)/MSO(3) | 30 |
| Ex. 28 | Sorbitan stearate/EO(20)/MSO(1) | 29 |
| Ex. 29 | Tristyrenated phenol/EO(25)/MSO(1) | 27 |
| | Oleylamine/PO(2)/MSO(2) | |
| Ex. 30 | Dodecylphenol/EO(10)/MSO(1) | 31 |
| | Tridecyl alcohol/EO(10) phosphate | |

(Note)
In Examples 24, 25, 29 and 30, the ratio of two emulsifiers was 1:1 by weight.

From the results shown in Table 4, it would be understood that even if the substituted succinic anhydride and the emulsifier are separately added without previously forming into a mixture, an excellent sizing effect can be exhibited.

In addition to the ingredients used in the Examples, other ingredients can be used in the Examples as set forth in the specification to obtain substantially the same results.

What we claim is:

1. A sizing agent comprising a substituted succinic anhydride of the formula (I):

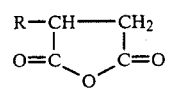

wherein R is a hydrocarbon group having at least 6 carbon atoms selected from the group consisting of an alkyl group, an alkenyl group, an aralkyl group or an aralkenyl group, and an emulsifier comprising a non-ionic surface active agent having a terminal tertiary hydroxyl group; the amount of said non-ionic surface active agent having a terminal tertiary hydroxyl group being from 1 to 25% by weight based on said substituted succinic anhydride.

2. The sizing agent of claim 1, wherein said non-ionic surface active agent having a terminal tertiary hydroxyl group is a polyoxyalkylene compound.

3. The sizing agent of claim 1, wherein said non-ionic surface active agent having a terminal tertiary hydroxyl group is a polyoxyalkylene compound having a terminal group derived from isobutylene oxide.

4. The sizing agent of claim 1, wherein said non-ionic surface active agent having a terminal tertiary hydroxyl group is a polyoxyalkylene compound having a terminal group derived from α-methylstyrene oxide.

5. The sizing agent of claim 1, wherein said non-ionic surface active agent having a terminal tertiary hydroxyl group is an addition reaction product of isobutylene oxide or α-methylstyrene oxide and a polyoxyethylene alkylphenyl or aralkylphenyl ether.

6. The sizing agent of claim 5, wherein said polyoxyethylene alkylphenyl or aralkylphenyl ether is an adduct of 3 to 40 moles of ethylene oxide and 1 mole of an alkyl- or aralkyl-phenol having a $C_4$ to $C_{28}$ alkyl or aralkyl group.

7. The sizing agent of claim 5, wherein said polyoxyethylene alkylphenyl or aralkylphenyl ether is an adduct of 10 to 25 moles of ethylene oxide and 1 mole of an alkyl- or aralkyl-phenol having a $C_{14}$ to $C_{20}$ alkyl or aralkyl group.

8. The sizing agent of claim 1, wherein the amount of said non-ionic surface active agent having terminal tertiary hydroxyl group is from 3 to 20% by weight based on said substituted succinic anhydride.

9. The sizing agent of claim 1, wherein said emulsifier further contains at least one member selected from the group consisting of anionic surface active agents, other non-ionic surface active agents having no terminal tertiary hydroxyl group and cationized starch.

* * * * *